United States Patent [19]

Kanda

[11] Patent Number: 5,212,798
[45] Date of Patent: May 18, 1993

[54] FLOPPY DISK DRIVE APPARATUS WITH VARIABLE ROTATION DISK SPEEDS AND VARIBLE STOPPING PERIODS

[75] Inventor: Kunio Kanda, Gotenba, Japan
[73] Assignee: Fanuc Ltc., Yamanashi, Japan
[21] Appl. No.: 377,823
[22] PCT Filed: Jan. 27, 1989
[86] PCT No.: PCT/JP89/00082
    § 371 Date: Apr. 28, 1989
    § 102(e) Date: Apr. 28, 1989
[87] PCT Pub. No.: WO89/07313
    PCT Pub. Date: Aug. 10, 1989

[30] Foreign Application Priority Data

Jan. 29, 1988 [JP] Japan .................. 63-017440

[51] Int. Cl.⁵ .................. G06F 9/22; G06F 9/445; G06F 13/14; G06F 12/06
[52] U.S. Cl. .................. 395/775; 364/239; 364/236.2; 364/237.9; 364/238.3; 364/239.4; 364/239.9; 364/239.6; 364/239.7; 364/242.91; 364/245.6; 364/246.5; 364/214.4; 364/268.5; 364/DIG. 1
[58] Field of Search .................. 364/200, 900; 360/78.04, 71; 395/275, 800, 500, 375, 250, 550, 725, 775, 425

[56] References Cited

U.S. PATENT DOCUMENTS

| | | | |
|---|---|---|---|
| 4,449,196 | 5/1984 | Pritchard | 364/768 |
| 4,517,641 | 5/1985 | Pinheiro | 395/275 |
| 4,536,836 | 8/1985 | Dodd et al. | 364/200 |
| 4,635,145 | 1/1987 | Horie et al. | 360/78 |
| 4,644,426 | 2/1987 | Saito | 360/71 |
| 4,644,436 | 2/1987 | Unno | 360/137 |
| 4,890,179 | 12/1989 | Baker | 360/132 |

FOREIGN PATENT DOCUMENTS

| | | |
|---|---|---|
| 58-211359 | 8/1983 | Japan . |
| 62-175964 | 8/1987 | Japan . |
| 2184577 | 6/1987 | United Kingdom . |

OTHER PUBLICATIONS

Patent Abstracts of Japan, vol. 7, No. 270 (p. 240)(1415), Dec. 2, 1983 JP-A-58-150168, Sep. 6, 1983.
Supplementary European Search Report, The Hague, mailed Apr. 21, 1992.

Primary Examiner—Thomas C. Lee
Assistant Examiner—Daniel H. Pan
Attorney, Agent, or Firm—Staas & Halsey

[57] ABSTRACT

A floppy disk drive apparatus in which, when a floppy disk is used as the memory medium for numerical control data, control is performed in such a manner that data to be transferred via an interface (4) is read out whenever there is a data transfer request from a numerical control unit (8). In particular, to an arrangement where a data read head is constantly in contact with the floppy disk, disk wear is made as small as possible by stopping the drive motor as the occasion may demand, and it is necessary that data be transferred to the numerical control unit without interruption. The drive apparatus of the invention performs optimum drive control in terms of prolonging the service life of the disk.

3 Claims, 1 Drawing Sheet

FLOPPY DISK DRIVE APPARATUS WITH VARIABLE ROTATION DISK SPEEDS AND VARIBLE STOPPING PERIODS

BACKGROUND OF THE INVENTION

1. Field of the Invention

This invention relates to a floppy disk drive apparatus for controlling a floppy disk drive and, more particularly, to a floppy disk drive apparatus used as an auxiliary memory of a numerical control unit.

2. Description of the Related Art

In a conventional computer system, a non-volatile external memory device generally is employed as an auxiliary memory, a magnetic disk device or the like having a large storage capacity is such a device. Recently, numerical control units for controlling NC machine tools also have come to employ floppy disks, which are inexpensive and have a large storage capacity, as auxiliary memory devices.

A floppy disk is a sheet of polyester or the like coated with a magnetic material and sealed in a jacket referred to as a diskette. The diskette has a slit for reading and writing recorded information. When the diskette is loaded in the floppy disk drive apparatus, the disk is rotated and information is read out or written in via a read/write head.

Floppy disks are of different types insofar as their storage density, size and the like are concerned, and the type used depends upon the particular application. At factory sites where machine tools are installed, 3.5 inch floppy disks, which are small in size and possess a shutter for opening and closing the recording surface to protect the same, are finding greater use.

In such devices the memory read/write head is in contact with the recording surface of the floppy disk at all times. When the disk is started rotating by an externally applied access command, input and output of data become possible. In general, disk wear time is on the order of one million passes per track; if the disk is used continuously, this is equivalent to 50 hours. In a case where the disk is used as an auxiliary memory of a numerical control unit, the disk is accessed from a main NC program by the required command. Therefore, when there is no current access with respect to a floppy disk controller, the drive motor is stopped. Unless wear of the recording surface of the floppy disk is prevented, the disk will soon reach the end of its service life and not only will the information recorded thereon be lost but this can also lead to malfunctioning of the machine tool during automatic operation.

Accordingly, the floppy disk controller in the prior art is adapted to halt the drive motor when the disk is not being accessed, thereby prolonging disk life. However, in order for a numerical control unit to execute an NC program smoothly, it is necessary for the contents of the auxiliary memory to be read in a short access time. To this end, in the prior art, the setting is such that the motor is controlled to stop at a fixed time, e.g., 30 seconds, after the floppy disk access command is completed in anticipation of the time up to the next access command. Control is such as to minimize lost time up to the moment a read-out enable state is attained when a read command is received following stopping of the motor.

With the conventional floppy disc controller described above, however, the drive motor is always made to stop after a fixed time period irrespective of the fact that the control characteristics of the disk drive motor, the speed at which data is read and the speed at which data is transferred to the numerical control unit after read-out differ from one system to another. Consequently, if the data transfer speed, for example, is low, the drive motor rotates more than necessary, thereby hastening disk wear. In other words, if the time needed for the next access command to arrive is estimated to be larger than necessary, the life of the floppy disk recording surface contacting the head for this time is shortened in proportion to the length of this time.

DISCLOSURE OF THE INVENTION

The present invention has been devised in order to solve the foregoing problems and its object is to provide a floppy disk drive apparatus which optimizes floppy disk rotation control based on the status of a transfer of data to a numerical control unit, and which makes it possible to execute an NC program smoothly.

In accordance with the present invention, there is provided a floppy disk drive apparatus, which is connected to a numerical control unit via a data transfer interface, for driving a floppy disk magnetically storing numerical control data and arranged so as to be accessible from the numerical control unit. The invention also includes means for reading the data, drive means for rotatively driving the disk while the reading means is held in contact with the floppy disk, monitoring means for monitoring a remaining amount of data not yet transferred by the interface after being read by the reading means, comparing means for comparing the remaining amount of data with a reference amount of data determined based on start-up time of the drive means, data read-out time and the speed at which the numerical control data is transferred by the interface, and drive control means for controlling the timing of commands for rotating and stopping the drive means based on results of the comparison.

Accordingly, the floppy disk drive apparatus of the present invention is such that a reference amount of data, which is computed based on the speed at which data is transferred from a buffer memory to a numerical control unit, start-up time of the drive motor and floppy disk read-out time, is compared with an untransferred remaining amount of data in the buffer memory. When the remaining amount of data attains the set reference amount of data, a rotation command is applied to the drive motor. When the remaining amount of data exceeds another predetermined quantity, control is exercised to halt the motor. In this way floppy disk rotation time becomes a minimum required time suited to the NC system, so that floppy disk wear can be held to the minimum. Accordingly, the floppy disk is not rotated at unnecessary times, namely at times other than when data is read, thereby prolonging the life of the recording surface.

DESCRIPTION OF THE PREFERRED EMBODIMENTS

An embodiment of the present invention will now be described in detail with reference to the drawings.

Figure 1:
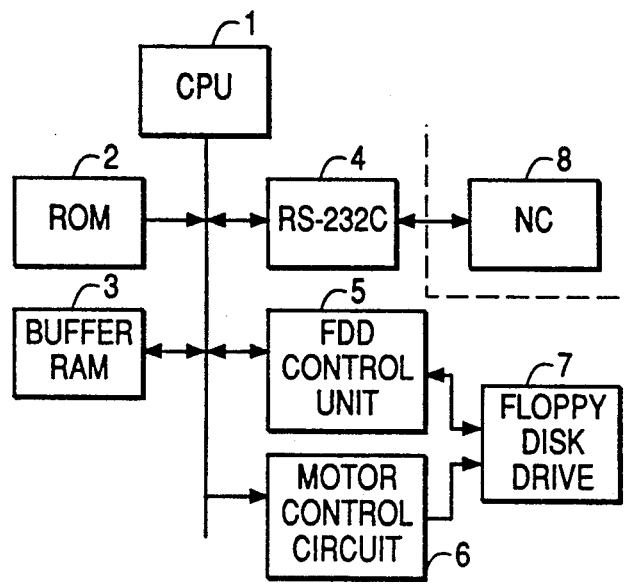
FIG. 1 is a block diagram illustrating the arrangement of an embodiment of the present invention.

In FIG. 1, numeral 1 denotes a microprocessor, 2 a control ROM storing a program which controls a drive motor, and 3 a buffer RAM serving as a buffer memory for temporarily storing data to be transferred to a numerical control unit 4 indicates an RS-232C interface control circuit capable of transferring data to the numerical control unit at a predetermined transfer speed, 5 a control circuit of the floppy disk drive apparatus, and 6 a motor control circuit of the, floppy disk drive apparatus. Reference number 7 indicates a floppy drive section having the drive motor, and 8 the numerical control unit for controlling a machine tool, which machine tool not shown.

As a result of data in buffer RAM 3 being transferred to the numerical control unit 8 via the RS-232C interface control circuit 4, the motor control circuit 6 commands the floppy drive section 7 to begin rotating when the amount of data remaining attains a predetermined amount, as described below. More specifically, even if there is an access command from the numerical control unit 8 to the floppy drive section 7 in accordance with the control program of the machine tool, the drive motor control circuit 6 does not immediately output a control command for driving the motor of the floppy drive section 7. First, the microprocessor 1 checks the amount of data remaining in the buffer RAM 3.

Figure 2:
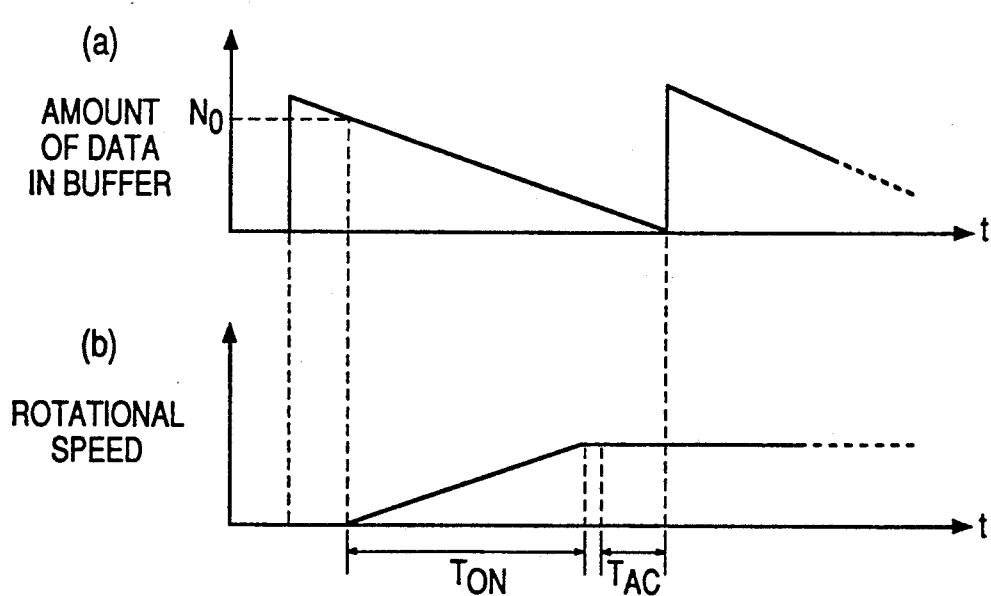
FIG. 2 is a view for describing timing at which a drive motor is controlled to rotate and stop.

FIG. 2(a) illustrates the remaining amount of data to be transferred to the numerical control unit 8, and FIG. 8(b) shows the rotational speed of the motor of floppy drive 7 controlled in conformity with the amount of remaining data. In order for data to be transferred to the numerical control unit 8 without interruption, it is necessary for the following to be true:

$$(C/B) \times N \geq T_{ON} + T_{AC}$$

Transforming the above equation, we have $$N \geq (T_{ON} + T_{AC}) \times B/C$$

where

N: the amount of data to be transferred from the buffer RAM 3 at the present time;
B: the speed at which data is transferred to the numerical control unit 8;
C: the number of characters of serial data;
$T_{ON}$: start-up time required for the drive motor to attain a steady rotational speed after the start of rotation is commanded;
$T_{AC}$: time required for data read-out from an accessed area of floppy drive section 7.

For example, assuming a system designed in such a manner that B=4800 baud, C=11 characters (eight-bit data+one start bit+two stop bits), $T_{ON}$=1 second and $T_{AC}$=167 milliseconds, the remaining amount of data $N_0$ which determines the timing of the rotation command is $$N_0 \geq (1 + 0.167) \times 4800/11$$

In other words, the setting should be such that $N_0 > 2043$ is true.

When the start of rotation of the drive motor is commanded at the time that the amount of data remaining in the buffer RAM 3 attains the above-mentioned value $N_0$, data is read out of the floppy disk during the time $T_{AC}$ following a slight interval for internal processing after a steady rotational speed is attained in the floppy drive section 7. When the amount of data N to be transferred becomes zero by virtue of the foregoing operation, new data is stored in the buffer RAM 3 and data is transferred to the numerical control unit 8 by the RS-232C interface control circuit 4 without interruption.

If the command for stopping the drive motor of the floppy drive section 7 is formed produced when an amount of data twice that of $N_0$ is detected as the amount of data N remaining in the buffer RAM 3, by way of example, rotating time of the drive motor is minimized, thus making it possible to prolong the life of the floppy disk.

Though an embodiment of the present invention has been described, the invention can be modified in various ways without departing from the scope of the claims.

The floppy disk drive apparatus of the present invention is such that a drive command applied to a floppy disk drive motor is controlled upon anticipating a start-up time of the drive motor and data read-out time and in conformity with the remaining amount of data in a buffer RAM to be transferred to a numerical control unit. As a result, data can be transferred to the numerical control unit without interruption and the drive motor rotates the minimum required amount. The invention is well suited for use as an auxiliary memory of a numerical control unit.

What is claimed is:

1. A floppy disk drive apparatus connected to a numerical control unit via a data transfer interface, for driving a floppy disk magnetically storing numerical control data accessible by the numerical control unit, said apparatus comprising:

reading means for reading the numerical control data from the floppy disk;
drive means for rotatively driving the floppy disk while said reading means is held in contact with the floppy disk;
monitoring means for monitoring a remaining amount of the numerical control data read from the floppy disk by said reading means not yet transferred by the data transfer interface;
comparing means for comparing the remaining amount of numerical control data with a reference amount of data calculated in dependence upon a start-up time of said drive means, a data read-out time and a a speed at which numerical control data is transferred by the data transfer interface; and
drive control means for controlling timing of commands for rotating and stopping said drive means responsive to the comparison by said comparison means.

2. A disk drive unit comprising:
a disk drive;
a disk drive control unit operatively connected to said disk drive and operatively connected to receive an access command;
a data buffer operatively connected to said disk drive control unit for storing data from the disk drive and for outputting the stored data;
control means for monitoring an amount of the data stored in said data buffer and for starting said disk drive only when the amount of data stored in said data buffer is not more than a predetermined amount N and an access command has been received by said disk drive control unit, wherein the predetermined amount N is determined in accordance with $N \geq (Ton + Tac) * B/C$, where B is a speed of data transfer out of said data buffer, C is a number of characters of serial data, Ton is a start-up time required for said disk drive to reach a steady rotational speed after said disk drive is started, and Tac is a time required to read data from said disk drive.

3. A disk drive control method for transferring data from a disk to a numerical control device, comprising the steps of:
(a) starting a drive amount of a disk drive containing the disk only when an amount of data to be outputted from a data buffer to the numerical control unit is not more than a predetermined amount N and an access command is received; and
(b) reading data from the disk in the disk drive when a steady rotational speed is reached by the drive motor, wherein the predetermined amount N is determined in accordance with $N \geq (Ton+Tac)*B/C$, where B is a speed of data transfer out of the buffer, C is a number of characters of serial data, Ton is a start-up time required for the drive motor to reach a steady rotational speed after the drive motor is started, and Tac is the time required to read data from the disk.

* * * * *

UNITED STATES PATENT AND TRADEMARK OFFICE
CERTIFICATE OF CORRECTION

PATENT NO. 5,212,798

DATED : May 18, 1993

INVENTOR(S): Kunio Kanda

It is certified that error appears in the above-indentified patent and that said Letters Patent is hereby corrected as shown below:

Title page, in the title, line 3, "VARIBLE" should be

--VARIABLE--.

Col. 1, in the title, line 3, "VARIBLE" should be

--VARIABLE--.

Col. 2, line 13, "DISCLOSURE" should be --SUMMARY--.

Col. 3, line 5, after "unit" insert --;--; and line 9, after "the" delete ",".

Col. 4, line 6, delete "formed".

Col. 5, line 10, "amount" should be --motor--.

Signed and Sealed this

Nineteenth Day of April, 1994

Attest:

BRUCE LEHMAN

Attesting Officer     Commissioner of Patents and Trademarks